Patented Aug. 3, 1926.

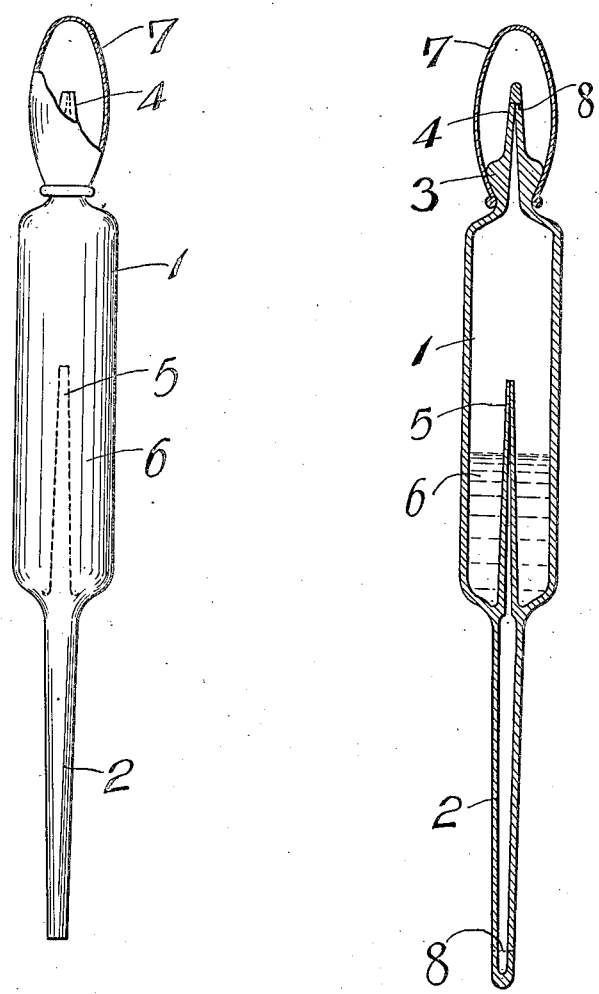

1,594,370

UNITED STATES PATENT OFFICE.

SEIICHI KUBOTA, OF TOKYO, JAPAN.

REAGENT CONTAINER.

Application filed September 30, 1924. Serial No. 740,720.

This invention relates to a test tube particularly designed to contain chemical reagents, by which various chemical tests can be easily and accurately made.

The test tube according to the invention is so characterized that it comprises a tubular vessel made of transparent material having at one end a slender tube closed at its free end, and also having at the other end a similar slender tube closed at its free end and provided with a globular portion to be covered by an india-rubber cap. The test tube is further provided with an inwardly extending fine and longer tube which has open ends.

The object of this invention is to make various chemical tests at any desired place by a suitable quantity of chemical reagent, previously contained in the test tube.

In the accompanying drawings which illustrate an embodiment of this invention,

Fig. 1 is a vertical sectional view of the test tube embodying the present invention and containing a chemical reagent and Fig. 2 is a side elevation, partly in section, in which both end portions are broken off at filed marks.

Now referring to the drawings, 1 represents a tubular vessel containing a suitable quantity of chemical reagent 6, said vessel being made of a transparent body such as glass, which has at its upper end a slender tube 4 and at its lower end another tube 2 and inner fine tube 5. 2 represents a slender tube closed at one end and connected at the other end to the tubular vessel 1. 4 represents a similar tube as above mentioned provided with a globular portion 3 to be covered by an india-rubber cap 7. 5 represents an inner fine tube used for passage of a liquid to be tested, 8 two filed marks at which the tube is to be broken off at the both ends, it being understood that these ends were sealed after the reagent 6 had been placed in the vessel 1.

The test tube of this invention is to be used as follows:

A suitable test tube containing the desired quantity of the chemical reagent is first selected in accordance with the kind of test to be made. After breaking off, at 8, the closed end portions of the tubes 2 and 4, the globular portion 3 is covered with the rubber cap 7. The end of the tube 2 is then immersed into the liquid to be tested and the cap 7 then pressed and released to draw a quantity of the liquid into the tube 1 through the tube 5 whereupon the drawn-in liquid will mix with the chemical reagent 6. After the liquid is contained in the tube 1 the tube 5 prevents the escape of the liquids so that a given quantity thereof will at all times be maintained within the test tube.

What is claimed is:

A chemical reaction testing device including a test tube having a body portion adapted to contain a chemical reagent, said body portion having extending outwardly therefrom at each end a tube closed at its free extremity and provided with a weakened portion at said extremity to permit of the latter being detached to open said tube, said body portion also having at one end an inwardly extending open tube communicating with the adjacent one of the first named tubes and through which a liquid to be tested is drawn into said body portion.

In testimony whereof I have affixed my signature.

SEIICHI KUBOTA.